(12) United States Patent
Na et al.

(10) Patent No.: US 11,047,831 B2
(45) Date of Patent: Jun. 29, 2021

(54) NONDESTRUCTIVE INSPECTION APPARATUS AND METHODS OF USE

(71) Applicant: KELLOGG BROWN & ROOT LLC, Houston, TX (US)

(72) Inventors: Jeong-Kwan Na, Centerville, OH (US); Travis Kemp, Arcanum, OH (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 16/511,077

(22) Filed: Jul. 15, 2019

(65) Prior Publication Data
US 2021/0018470 A1    Jan. 21, 2021

(51) Int. Cl.
*G01N 29/28* (2006.01)
*G01N 29/04* (2006.01)
*G01N 29/22* (2006.01)

(52) U.S. Cl.
CPC ......... *G01N 29/221* (2013.01); *G01N 29/043* (2013.01); *G01N 29/28* (2013.01); *G01N 2291/0289* (2013.01)

(58) Field of Classification Search
CPC .... G01N 29/221; G01N 29/28; G01N 29/043; G01N 2291/0289
USPC .......................................................... 73/602
See application file for complete search history.

(56) References Cited

U.S. PATENT DOCUMENTS

| | | | |
|---|---|---|---|
| 3,431,440 A * | 3/1969 | Osgood | G01N 29/28 73/644 |
| 3,977,236 A | 8/1976 | Raatz, Jr. et al. | |
| 4,322,975 A | 4/1982 | Schmidt et al. | |
| 5,510,709 A | 4/1996 | Hurley et al. | |
| 5,646,538 A * | 7/1997 | Lide | G01B 7/282 324/601 |
| 7,328,619 B2 | 2/2008 | Moles et al. | |

(Continued)

FOREIGN PATENT DOCUMENTS

GB        2292610 A        2/1996

OTHER PUBLICATIONS

Cayt Harding, Geoffrey Hugo and Susan Bowles; "Automated Ultrasonic Inspection for Crack Detection at F-111 Lower Wing Skin Fastener Holes"; 12th A-PCNDT 2006—Asia-Pacific Conference on NDT, Nov. 5-10, 2006, Auckland, New Zealand; (8 pages).

(Continued)

*Primary Examiner* — Jacques M Saint Surin
(74) *Attorney, Agent, or Firm* — Gary M. Machetta (57) ABSTRACT

A method for testing a body having a feature and an outer surface includes configuring a probe to emit a focused ultrasonic beam; configuring a control unit to control the probe, adjusting a focal distance of a focal point of the beam with reference to a test location; adjusting a position of the focal point along at least one axis with reference to the feature; emitting the beam into the outer surface; and determining a presence of a crack at the test location by evaluating % a signal response from the probe. A related apparatus includes the control unit, the transducer, and a shoe assembly having a shoe member and a shoe adapter. A coupling fluid in a variable volume chamber in the shoe adapter separates the transducer from the shoe member and allows changes in a focal distance of the focal point. The apparatus also includes one or more positioners for adjusting a position of the focal point.

15 Claims, 5 Drawing Sheets

(56) References Cited

U.S. PATENT DOCUMENTS

| | | | | |
|---|---|---|---|---|
| 8,464,434 | B1* | 6/2013 | Kostenick | G01B 21/14 |
| | | | | 33/542 |
| 8,661,906 | B2* | 3/2014 | Meinert | G01N 29/28 |
| | | | | 73/649 |
| 9,429,412 | B2* | 8/2016 | Nakamura | G01B 5/18 |
| 9,586,699 | B1* | 3/2017 | Vail, III | B29C 73/10 |
| 9,945,817 | B2 | 4/2018 | Pember et al. | |
| 2013/0216766 | A1* | 8/2013 | Tanaka | B32B 5/26 |
| | | | | 428/99 |
| 2013/0220018 | A1* | 8/2013 | Kollgaard | G01N 29/0645 |
| | | | | 73/618 |
| 2017/0052151 | A1* | 2/2017 | deWalle | G01N 29/4427 |

OTHER PUBLICATIONS

Ward D. Rummel; "Nondestructive Evaluatoin—A Critical Part of Structural Integrity"; 1st International Conference on Structural Integrity, ICONS-2014; ScienceDirect; Procedia Engineering 86 (2014) 375-383; D&W Enterprises, Ltd; Littleton, Colorado (9 pages).

Chien-P. Chiou, Frank J. Margetan and James H. Rose; "Ultrasonic Detection of Cracks Below Bolts in Aircraft Skins"; Center for NDE, Iowa State University, Ames, Iowa; Review of Progress in Quantitative Nondestructive Evaluation, vol. 10B; Plenum Press, New York, 1991 (8 pages).

K.I. McRae and R. W. Nolan; "Ultrasonic Imaging of Cracks Under Installed Fasteners"; Air Vehicles Research Detachment, National Defence Headquarters, Ottawa, Canada (7 pages) 1998.

Jennifer E. Michaels, Thomas E. Michaels and Bao Mi; "An Ultrasonic Angle Beam Method for in situ Sizing of Fastener Hole Cracks"; Journal of Nondestructive Evaluation, vol. 25, No. 1, Mar. 2006 (14 pages).

Deborah Hopkins, Marvin Datuin, John Aldrin, Mark Warchol, Lyudmila Warcho and David Forsyth; "Localization and Characterization of Fatigue Cracks around Fastener Holes Using Spherically focused Ultrasonic Probes"; AIP Conference Proceeding 1806, 090007; https://doi.org/10.1063/1.4974651; Feb. 16, 2017 (11 pages).

Matthieu Hollette, Herve Tretout, Hubert Voillaume and Josua Guerid; "Crack Detection Around Fastener Holes with Total Focusing Method Ultrasonic System"; 12th ECNDT; Gothenburg—Sweden, 2018 (3 pages).

Yushi Sun, Tianhe Ouyang, Jiadong Xu and Jie Long; "Crack Detection in Aircraft Fastener Holes Using Flat Geometry Remote Field Eddy Current Technique and Super Sensitive Eddy Current System"; Innovative Materials Testing Technologies, Inc. (IMTT); Ames, IA (8 pages),2006.

Maritime Division, Defence Science and Technology Group; "Discrimination between Fatigue Cracking and Mechanical Damage in Aircraft Fastener Holes by Eddy-Current Phase Rotation"; Australia; Aug. 2016 (44 pages).

Jeong K. Na, James L. Blackshire and Shaun L. Freed; "Effect of Irregularity in Shape and Boundary of a Macro-Texture Region in Titanium"; AIP Conference Proceedings 1706; https://doi.org/10.1063/1.494055; Feb. 10, 2016 (10 pages).

Paul Fromme, Mahir B. Sayir; "Detection of Cracks at River Holes Using Guide Waves"; Institute of Mechanical Systems, ETH Zurich—Swiss Federal Institute of Technology, Zurich, Switzerland, Ultrasonic, 2002 (5 pages).

* cited by examiner

NONDESTRUCTIVE INSPECTION APPARATUS AND METHODS OF USE

BACKGROUND

1. Field

Embodiments described herein generally relate to systems and methods for nondestructive testing of machinery.

2. Description of the Related Art

Figure 1:
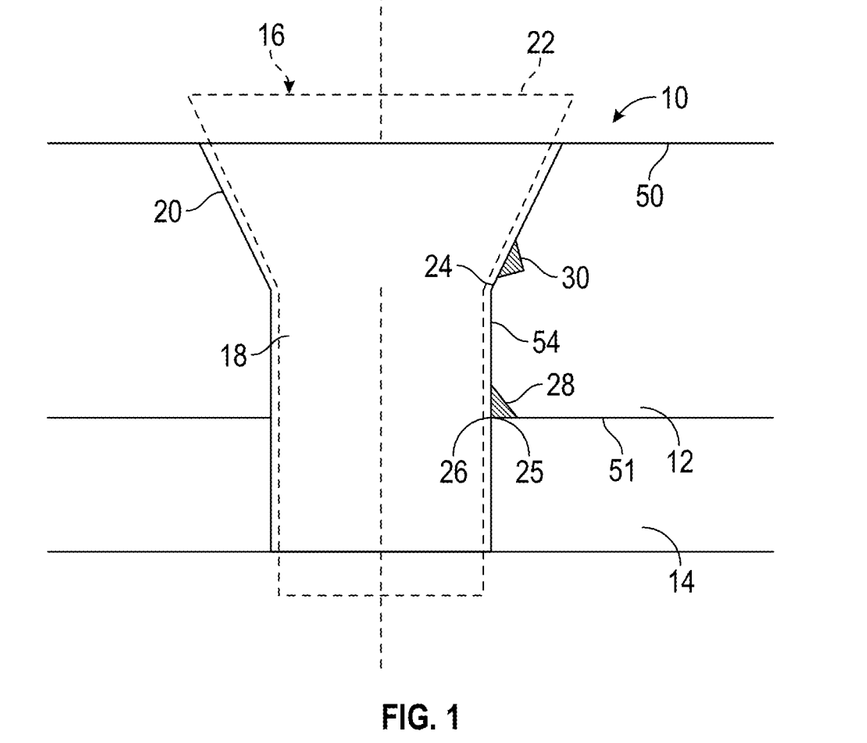
FIG. 1 illustrates a sectional view of an assembly having one or more surface discontinuities.

Nondestructive testing of machinery is often required to determine whether such machinery is encountering wear or other structural degradation that could impair service life or proper operation. By way of example, nondestructive testing may be used to evaluate the physical condition for material discontinuity. Referring to FIG. 1, there is shown an assembly 10 made up of a first planar body 12 and a second planar body 14. The bodies 12 and 14 are compressively fixed to one another at features that may require testing. These features may include objects such as one or more fastening elements 16 (shown in hidden lines) disposed in complementary shaped openings 18 that are defined by the adjacent surfaces. The opening 18 may have an enlarged diameter opening 20, or countersink, to accommodate a head 22 of the fastening element 16. The assembly 10 is representative of fastening arrangements found on aircrafts, water crafts, and other such vessels.

During operation, stress concentrations may cause one or more cracks to occur at a corner 24 of the countersink 20 and/or a corner 26 at a faying surface 25. Representative cracks are shown with numerals 28, 30. As used herein, a "crack" refers to any void, cavity, tear, fissure, perforation, or other undesirable physical discontinuity on a surface. It should be noted that the cracks 28, 30 are not visible because they are physically enclosed by the fastening element 16 and the second planar body 14. It is undesirable to disassemble the assembly 10 because such disassembly is not only time consuming but may also damage the connection.

The present disclosure addresses the need to detect the presence of cracks, or other undesirable surface discontinuities, associated with features that are not visible while a device or system is in an assembled state.

SUMMARY

In aspects, the present disclosure provides a method for testing a body having a feature and an outer surface. The method many include: determining a test location for the feature; configuring a probe to emit a focused ultrasonic beam formed of longitudinal waves, the focused ultrasonic beam having a focal point and a focal distance; configuring a control unit to control the probe, wherein the probe emits the focused ultrasonic beam in response to an electrical signal applied by the control unit, and wherein the control unit is further configured to detect a signal response from the probe; adjusting the focal distance of the focal point with reference to the test location; adjusting a position of the focal point along at least one axis with reference to the feature, wherein the at least one axis is perpendicular to an axis normal to the outer surface of the body; emitting the focused ultrasonic beam into the outer surface, wherein the ultrasonic beam enters the outer surface at an angle that converts the longitudinal waves into shear waves; and determining a presence of a crack at the test location by evaluating the signal response received by the control unit from the probe.

In aspects, the present disclosure also provides an apparatus for testing for testing a body having a feature and an outer surface. The apparatus may include a transducer emitting an ultrasonic beam in response to an applied electrical signal, the ultrasonic beam being formed of longitudinal waves that travel parallel to a longitudinal axis and concentrate to a focal point, the focal point having a focal distance; a shoe assembly having a shoe member and a shoe adapter, the shoe member having an end face and a contact face, wherein the contact face is non-perpendicular to the longitudinal axis, wherein the shoe adapter at least partially encloses the transducer and the shoe member, and wherein a chamber formed in the shoe adapter separates the transducer from the end face; at least one positioner configured to adjust a position of the focal point along at least one axis perpendicular to an axis normal to the outer surface; a coupling fluid filling the chamber, wherein changing an amount of coupling fluid in the chamber changes a focal distance of the focal point; and a control unit configured to apply the electrical signal to the transducer.

It should be understood that examples of certain features of the disclosure have been summarized rather broadly in order that the detailed description thereof that follows may be better understood, and in order that the contributions to the art may be appreciated. Them are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 2:
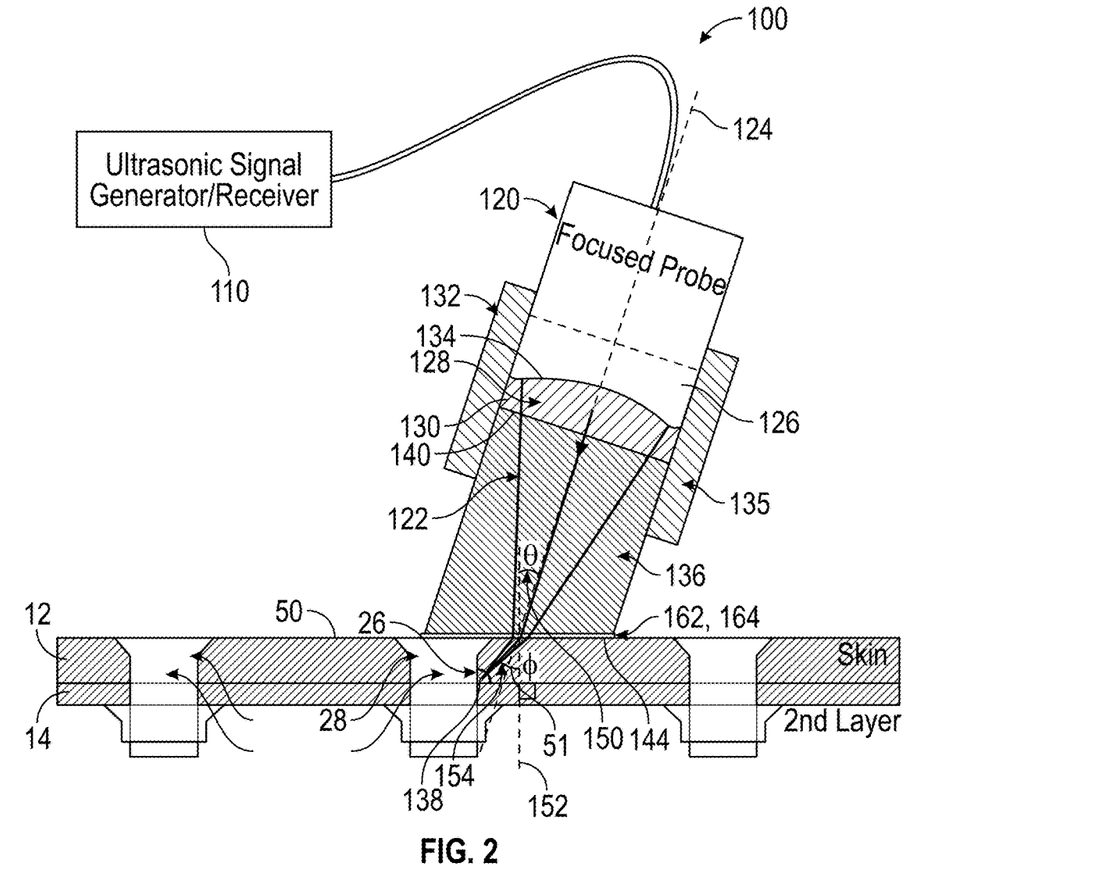
FIG. 2 depicts a schematic sectional view of a NDT tool assembly according to one embodiment of the present disclosure.

Referring to FIG. 2, there is shown one non-limiting embodiment of a nondestructive inspection (NDI) tool 100 according to the present disclosure for identifying undesirable surface discontinuities such as the cracks 28,30 shown in FIG. 1. The NDI tool 100 may include a control unit 110 and a probe 120. The control unit 110 is configured to generate an electrical signal that is used by the probe 120 to emit a corresponding ultrasonic acoustic beam. The control unit 110 is also configured to function as a receiver than detects electrical signal from the probe 120. These received electrical signals may be referred to as a signal response. The control unit 110 may be configured in a conventional manner using known microprocessors, circuitry, memory modules, algorithms, displays etc. The control unit 110 may also include, or cooperate with, a general purpose computer, mobile phones, and other similar information processing devices that have bi-directional signal communication capabilities as well as displays that visually depict a signal response.

The probe 120 is configured to emit a focused ultrasonic beam 122 in response to the electrical signals generated and transmitted by the control unit 110. The ultrasonic beam 122 travels parallel to the longitudinal axis 124 of the probe 120, at least while in the probe 120. In one embodiment, the probe 120 an element 126 responsive to electrical signals, a chamber 128 filled with a coupling fluid 130, and a shoe assembly 132.

In one non-limiting arrangement, the transducer element 126 may be a piezoelectric element that emits longitudinal ultrasonic acoustical waves in response to an applied electrical stimulus. One or more of the transducer elements 126 may include a concave surface 134 that shapes the emitted beam 122 into a concentrated conical beam having a focal point 138 at a selected distance from the concave surface 134. This distance will be referred to as the focal distance; i.e., the focal distance. The focal distance may be measured along an axis normal to the surface 50 of the first planar body 12, and therefore may also be referred to as a focal depth.

The coupling fluid 130 in the chamber 128 is disposed inside the shoe assembly 132 and adjacent to the concave surface 134. The coupling fluid 130 may be a liquid having acoustical properties selected to reduce the acoustic impedance mismatch that may otherwise exist between the transducer element(s) 126 and the shoe assembly 132. Suitable coupling fluids include, but are not limited to, liquids such as water and gels. Additionally, the volume or amount of the coupling fluid 130 may be adjusted in order to adjust (i.e., increase or decrease) the distance between the concave surface 134 and the focal point 138.

The shoe assembly 132 transmits the ultrasonic signals conveyed by the coupling fluid 130 to a surface 50 of the first planar body 12. The shoe assembly 132 includes an adapter 135 and a shoe member 136. The adapter 135 may be a housing that surrounds and encloses some or all of the transducer(s) 126 and the shoe member 136. The chamber 128 may an interior volume defined by an inner surface of the adapter 135, the concave surface 134, and an end face 140 of the shoe member 136. A port (not shown) or other selectively sealed opening may be used to inject or withdraw the coupling fluid 130 from the chamber 128. The chamber 128 may be considered a variable volume chamber because the addition or removal of coupling fluid 130 changes the volume of the chamber 128 by changing the distance between the end face 140 and the concave surface 134. The shoe member 136 may be an elongated body formed of a material having acoustic transmission properties that allow ultrasonic signals received at the end face 140 to be transmitted to an opposing contact face 144 of the shoe member 136.

To generate shear waves in the first planar body 12, the contact face 144 of the shoe member 136 has a non-perpendicular orientation relative to the longitudinal axis 124 of the probe 120. As a result, the longitudinal axis 124 of the probe 120 has an angular offset 150 from an axis 152 that is normal to an outer surface 50 of the first planar body 12. The angular offset 150, or oblique incident beam angle 150, may in the range of 15° to 25°.

As described below, the probe 120 illustrated in FIG. 2 may be used to locate the cracks 28, 30 in one or more features as depicted in FIG. 1.

Referring to FIGS. 1 and 2, the probe 120 may be used to identify cracks 28 at the faying surface 25 by positioning a focal point 138 of the beam 122 at a corner 26 of the faying surface 25. The corner 26 may be at an end of a bore section 54 that extends from the countersink 20. In one arrangement, the positioning of the focal point 138 is a two step process. In many cases, the nominal thickness of the first planar body 12 is known from fabrication drawings, blueprints, manufacturing specifications, etc. Thus, the probe 120 may be configured to position the focal point 138 using information from these reference materials. For example, this reference material may be used to determine or calculate the necessary required distance between the concave surface 134 and the contact face 144 in order to properly position the focal point 138. Prior to testing, the probe 120 may be operated to determine if the focal point 138 is, in fact, accurately positioned. If not, the amount of coupling fluid 130 in the chamber 128 that separates the concave surface 134 and the end face 140 of the shoe member 136 may be increased or decreased to correspondingly increase or decrease the distance separating the concave surface 134 and the end face 140. Adjusting the separation distance causes a corresponding change in the location of the focal point 138; i.e., shifting the focal point 138 toward or away from a bottom surface 51 of the first planar body 12.

Figure 3:
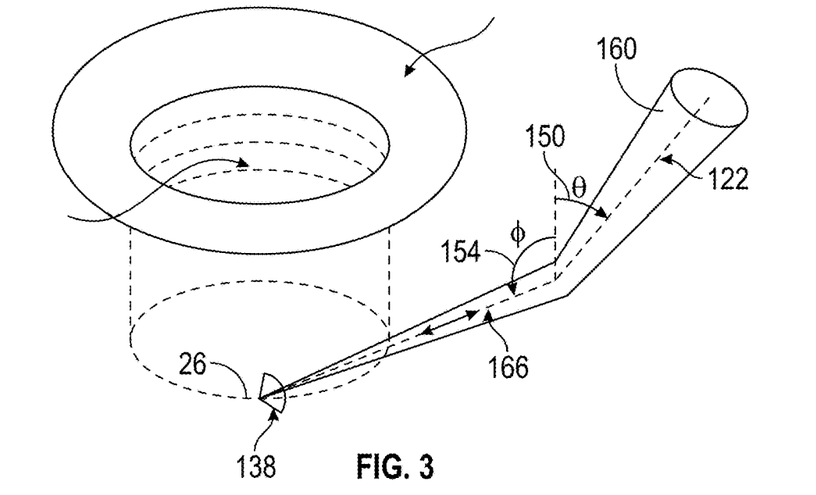
FIG. 3 depicts an illustrative ultrasonic beam emitted by the FIG. 2 embodiment.

Referring to FIGS. 2 and 3, there is shown an illustrative example of a mode-shifted focused beam 122 generated by the probe 120 of FIG. 2 for identifying cracks at the corner 26 of the faying surface 25. The emitted beam 122 begins as a longitudinal wave in the region 160 within the shoe assembly 132. As best seen in FIG. 2, at location 162, the beam 122 travels through a film 164 of a coupling liquid, such as water or gel, between the contact surface 144 and the outer surface 50. The film 164 enhances the acoustical coupling between the surfaces 144, 50. Because of the oblique incident beam angle 150, the beam 122 is shifted from longitudinal waves to shear waves in the first planar body 12. Upon entering the first planar body 12, the beam 122 has a refraction angle 154, typically between 33° to 63°, with respect to the normal axis 152. The refracted beam 154 travels through a section 166 of the first planar body 12 and concentrates to then apex 138. If a crack is present, then the acoustic shear wave is reflected back and returns to the probe 120 along the same path.

Figure 4A:
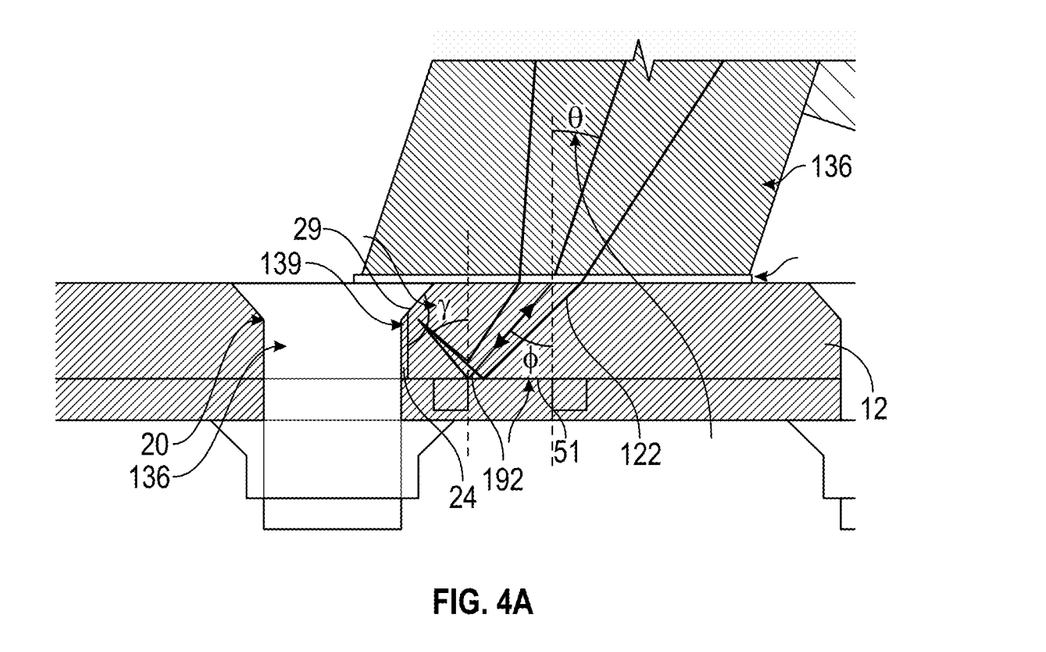
FIG. 4A depicts a portion of the FIG. 2 embodiment.
Figure 4B:
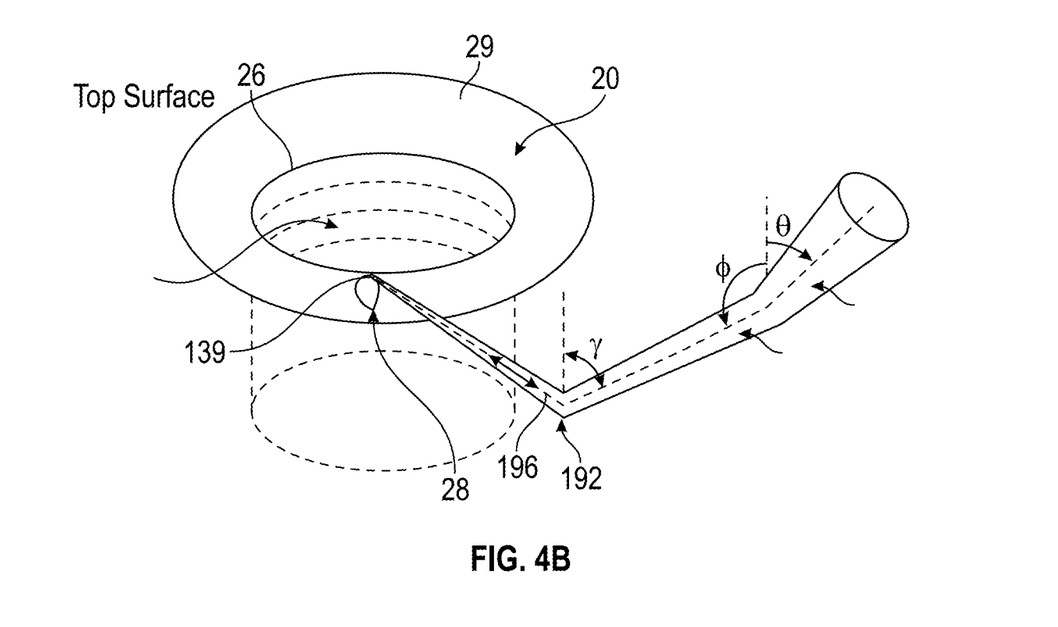
FIG. 4B depicts another illustrative ultrasonic beam emitted by the FIG. 2 embodiment.

Referring to FIGS. 4A and B, there is shown an illustrative example of a mode-shifted focused beam 122 generated by the probe 120 of FIG. 2 for identifying cracks at the corner 24 of the countersink region 20; i.e., a feature of interest. The emitted beam 122 travels through the shoe member 136 and a majority of the first planar body 12 as described in connection with FIG. 3. However, the focal length is selected such that the beam 122 does not concentrate to a focal point at the bottom surface 51. Instead, the beam 122 reflects off the bottom surface 51 at point 192 and travels through the region 196 toward a wall 29 defining the countersink 20. After the focal point 139 is properly positioned at the corner 24, and if a crack is present, then the acoustic shear wave is reflected back and returns to the probe 120 along the same path.

Figure 5:
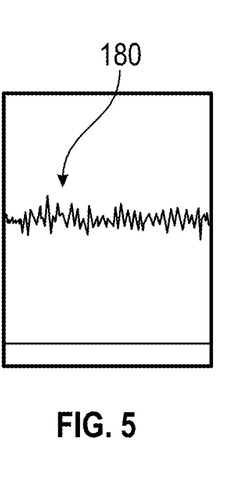
FIG. 5 illustrates a signal pattern obtained by embodiments of NDT tool assemblies according to the present disclosure that indicates no cracks are present.
Figure 6:
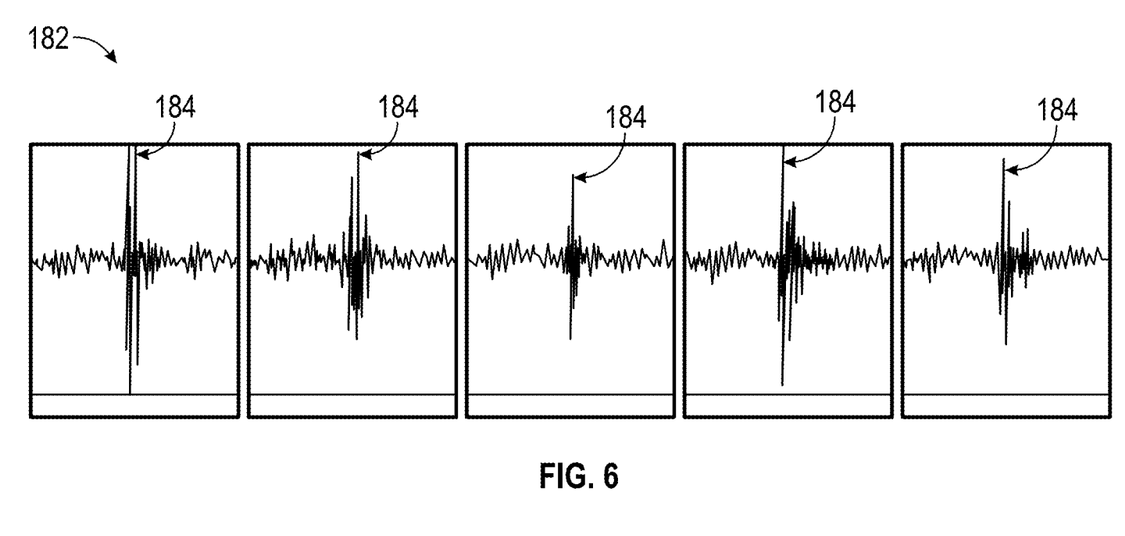
FIG. 6 illustrates a signal pattern obtained by embodiments of NDT tool assemblies according to the present disclosure that indicates the presence of cracks.

As described above, cracks 28, 30 reflect the beam 122 back through the first planar body 12. The reflected beam 122 thereafter returns to the probe 120. In response to receiving the reflected beam 122, the transducer element(s) 126 generate electrical signals that are received by the control unit 120. FIGS. 5 and 6 illustrate signal responses exemplary of the such received signals.

If the surfaces proximate to the corners 24, 26 are free of defects cracks, then the control unit 110 displays a signal 180 as illustrated in FIG. 5. The signal 180 may have a waveform with only minimal changes in amplitude over time. If the surfaces proximate to the corners 24, 26 have a crack, then the control unit 110 displays a signal 182 as illustrated in FIG. 6. The signal 182 may have a shape that includes one or more spikes 184 in amplitude over time. As illustrated, the signal 182 indicates the presence of five cracks, each of which is represented by a spike 184. Depending on the particular application, an amplitude of a spike indicating a crack, or other undesirable deformity, may be twice that of an amplitude of a signal indicate the absence of such a crack. In other arrangements, the amplitude of a spike may be 3 times, 5 times, 7 times, or at least 10 times the amplitude of a signal that indicates the absence of a crack. It should be appreciated that the magnitude in difference between the two amplitudes provides greater contrast, which can assist an operator in accurately identifying spikes indicative of cracks.

Figure 7:
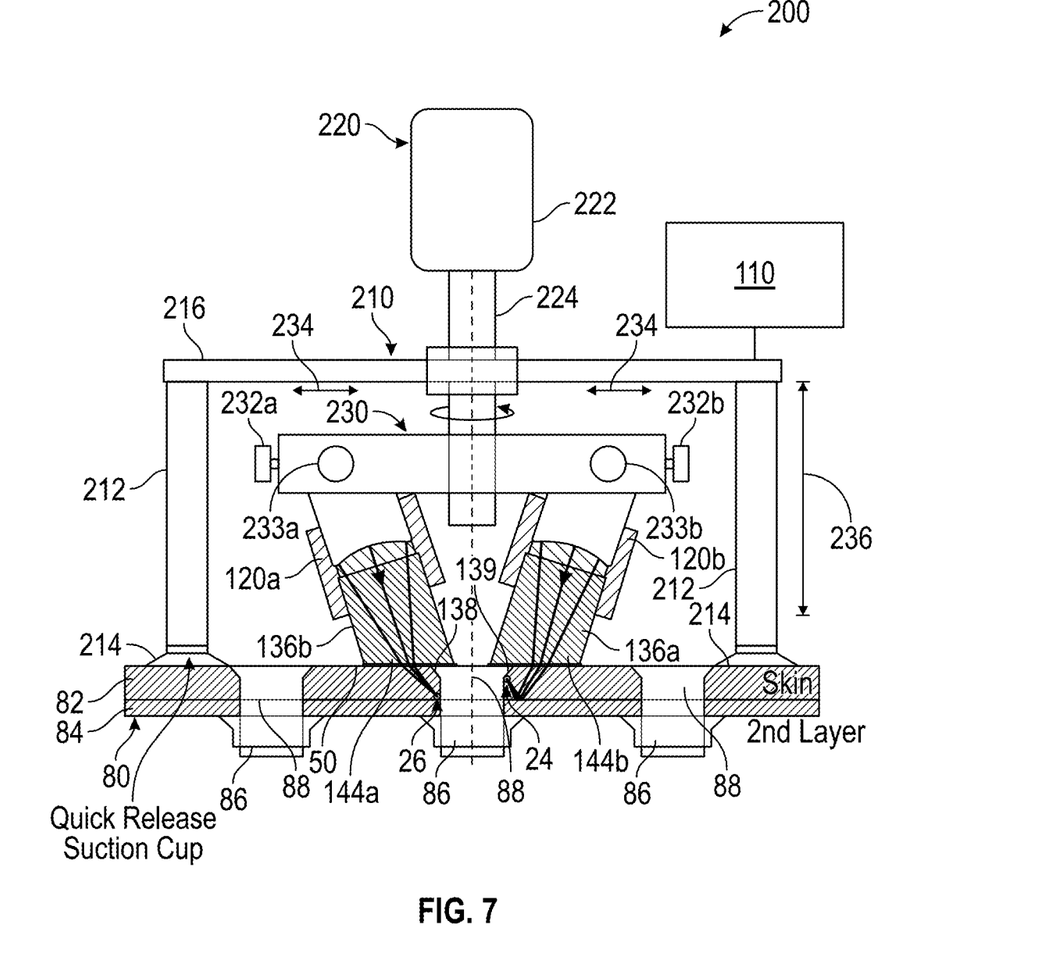
FIG. 7 depicts a schematic sectional view of a NDT system according to one embodiment of the present disclosure.

Referring to FIG. 7, there is shown one non-limiting embodiment of a NDT tool assembly 200 in accordance with the present disclosure for performing nondestructive testing at one or more features of a body. The tool assembly 200 may include a control unit 110, a frame 210, rotary drive unit 220, a probe support 230, and probes assemblies 120a, 120b. The tool assembly 200 is shown on a section of an aircraft wing 80, which has a skin 82, a second layer 84, and a plurality of fasteners 86, and associated openings 88.

The frame 210 may include two or more stands 212, each of which may have releasable engagement members 214, which may be quick release suction cups. The frame 210 also includes a cross member 216 that interconnects the stands 212 and supports the rotary drive unit 220.

The rotary drive unit 220 may include a motor 222 and a drive shaft 224. The drive shaft 224 connects the motor 222 to the probe support 230. The motor 222 may be any conventional motor configured to generate rotary power, e.g., electrical, hydraulic, pneumatic, etc. Also, the motor 222 may be energized using a local power source, such as a battery, and/or a separate power source via a suitable power-conveying line.

The probe support 230 is configured to selectively position the probe assemblies 120a, 120b with reference to the openings 88. The probe assemblies 120a, 120b may be fixed to the probe support 230 to project their respective shoe members 136a,b, respectively, downward toward the openings 88 and to have the contact surfaces 144a, 144b, parallel and in contact with the skin 82. The probe support 230 may be a bar, tube, cylinder, rod or other suitable elongated member.

The probe support 230 may include one or more positioner sets 232a,b and 233a,b that can independently move each of the probes 120a, 120b in the "x" direction 234, or the "y" direction (not shown), which is orthogonal to the "x" direction 234. For example, the positioner 232a may move the probe 120a towards or away from the drive shaft 224, or the "x" direction. The positioner 233a may move the probe 120a towards or away from the skin 82, or the "y" direction, or in a direction orthogonal to and on the same plane as the "x" direction. The positioner sets 232a,b and 233a,b may use known mechanical features such as threads or gears that may be actuated to translate the probes 120a,120b in the desired direction. It should be appreciated that the positioner sets 232a,b and 233a,b allow the probes 120a,120b to be positioned and repositioned as needed in situ after being positioned on the body 50.

The control unit 110 is generally as described in connection with FIG. 2 and is in signal communication with the probes 120a,b using wired or wireless transmission systems. In some embodiments, the control unit 110 may also be configured to operate the rotary drive unit 220.

In an exemplary method of use, the probes 120a, 120b are initially configured using known dimensional information for the aircraft wing 80. Such information may include the thickness of the skin 82, the dimensions of the fasteners 86, and the geometry and dimensions of the opening 88. Based on this information, or reference data, the focal points 138, 139 of the probes 120a,b, respectively, and the angles of incidence may set by appropriately configuring the probe 120a,b. In an illustrative arrangement, the probe 120a is configured to test the corner 26 of the faying surface 25 (FIG. 1) and the probe 120b is configured to test the corner 24 (FIG. 1) of the countersink 20 (FIG. 1).

The NTD tool assembly 200 may then be positioned on the skin 82 such that the probes 120a,b have the required position and orientation relative to a selected opening 88, at least in view of the reference data. The releasable engagement members 214 may be actuated to fix the tool assembly 200 to the skin 82.

Next, a second configuration, or calibration, may be performed to precisely position the focal points 138,139 of the probes 120a, 120b, respectively. An exemplary calibration step may include adding or removing coupling fluid 132 (FIG. 2) as discussed previously to accurately position the focal points 138, 139. Next, the positioners 232a,b and 233a,b may be moved to independently translate each of the probes 120a,b along one or more desired axes.

Testing can begin by monitoring a signal display and energizing the rotary power drive 220. As the probe 120a,b rotate around the opening 88, the operator can monitor the display of the control unit 110 for amplitude spikes associated with cracks. It should be noted that a single rotation provides test results for two discrete locations where cracks may occur. The data from the probe 120a,b may be recorded and stored in a suitable memory device, analyzed locally by an operator, and/or transmitted to a remote location for recording and/or analysis.

It should be appreciated that focal points 138, 139 can be precisely positioned in situ after the NDT tool assembly 200 has been positioned on the skin 82. Further positioning or repositioning of the focal points 138, 139 may be performed without removing the NDT tool assembly 200 from the skin 82.

It should be understood that the NDT tool assembly 200 may be configured to be operated by human input and actuation, operated by machine intelligence, or a hybrid of human and machine control. That is, a human operator may manually and visually perform the set-up, calibration, and testing. Alternatively, the control unit 110, or other suitable controllers, may use signals from the probes 120a,b to automatically control the positioners, which may have actuators (not shown), to obtain the necessary accuracy and positioning of the focal points 138,139 and thereafter perform the testing sequence.

It should be understood that the embodiments described above are merely illustrative of the teachings of the present disclosure. Some variants are described below.

For simplicity, the description above is directed to testing performed at two locations, namely corners 24 and 26 (FIG.

1). However, it should be appreciated that the tools and methods described above may be used to test any location in the first planar body 12 or other locations of interest. It should be further appreciated that the present disclosure may be used to test locations in or on any object or body irrespective of geometric configuration.

As noted above, referring to FIG. 2, the focal distance of the probe 120 may be adjusted by adding or removing coupling fluid 130 in the chamber 128. In some embodiments, the coupling fluid 130 may be added or removed manually. In other embodiments not shown, a fluid mover in fluid communication with a reservoir of coupling fluid 130 may be used to add and/or remove coupling fluid 130. The fluid mover may be as simple as a manually activated piston cylinder (syringe) or as complex as a reversible pump.

Further, in embodiments, the amount of coupling fluid 130 added or removed may be determined by a human operator. In other embodiments, the control unit 110 or other suitably programmed computing device may use the signals from the probe 120 to add or remove coupling fluid 130 until a desired resolution is reached.

Additionally, referring to FIG. 7, the test assembly 200 includes one or more positioners to assist in independently positioning the probes 120a,b. In variants, the test assembly 200 may also include positioners that position the probes 120a,b as a unit. For example, positioning devices that allow the probes 120a,b as a group may be incorporated into the frame 210 or the drive shaft 224. Such positioning devices may allow shifting the probes 120a,b along one or more different axes.

In variants, the configuration of the test assembly 200 may use tracks, rails, wheels or other such devices to enhance the mobility of the test assembly 200. Such mobility may assist in moving the test assembly 200 from one opening to another.

It should be appreciated that test assemblies of the present disclosure may be configured to be portable and easily carried by personnel. It should also be appreciated that embodiment of the present disclosure may be constructed to be light enough to be conveyed by drones from one location to another.

While the foregoing is directed to embodiments of the present disclosure, other and further embodiments of the disclosure may be devised without departing from the basic scope thereof, and the scope thereof is determined by the claims that follow.

What is claimed is:

1. A method for testing a body having a feature and an outer surface, the method comprising:
    determining a test location for the feature;
    configuring a probe to emit a focused ultrasonic beam formed of longitudinal waves, the focused ultrasonic beam having a focal point and a focal distance;
    configuring a control unit to control the probe, wherein the probe emits the focused ultrasonic beam in response to an electrical signal applied by the control unit, and wherein the control unit is further configured to detect a signal response from the probe;
    adjusting the focal distance of the focal point with reference to the test location;
    adjusting a position of the focal point along at least one axis with reference to the feature, wherein the at least one axis is perpendicular to an axis normal to the outer surface of the body;
    emitting the focused ultrasonic beam into the outer surface, wherein the ultrasonic beam enters the outer surface at an angle that converts the longitudinal waves into shear waves; and
    determining a presence of a crack at the test location by evaluating the signal response received by the control unit from the probe.

2. The method of claim 1, wherein the feature includes a surface defining an opening in the body and an object disposed in the opening.

3. The method of claim 2, wherein the position of the focal point is adjusted with reference to a size of the opening, a size of the object, and a location of the opening.

4. The method of claim 3, wherein the at least one axis includes at least two orthogonal axes, and wherein the position of the focal point is adjusted along both of the least two orthogonal axes.

5. The method of claim 2, wherein the body is a wing of an aircraft and the object is a fastener.

6. The method of claim 1, wherein the feature includes a plurality of features, and wherein the adjusting the focal distance, adjusting the position of the focal point, emitting the focused ultrasonic beam, and determining the presence of the crack is performed on at least two features of the plurality of features.

7. The method of claim 1, further comprising:
    determining a second test location for the feature;
    configuring a second probe to emit a second focused ultrasonic beam formed of longitudinal waves, the second focused ultrasonic beam having a second focal point and a second focal distance;
    configuring the control unit to control the second probe, wherein the second probe emits the second focused ultrasonic beam in response to a second electrical signal applied by the control unit, and wherein the control unit is further configured to detect a second signal response from the second probe;
    adjusting the second focal distance to cause the second focal point to be positioned at the second test location;
    adjusting a position of the second focal point along the at least one axis with reference to the feature;
    emitting the second focused ultrasonic beam into the outer surface, wherein the second ultrasonic beam enters the outer surface at an angle that converts the longitudinal waves into shear waves; and
    determining a presence of a second crack at the second test location by evaluating the second signal response received by the control unit from the second probe.

8. The method of claim 7, wherein the focused ultrasonic beam and the second focused ultrasonic beam are emitted at the same time into the outer surface.

9. An apparatus for testing for testing a body having a feature and an outer surface, comprising:
    a transducer emitting an ultrasonic beam in response to an applied electrical signal, the ultrasonic beam being formed of longitudinal waves that travel parallel to a longitudinal axis and concentrate to a focal point, the focal point having a focal distance;
    a shoe assembly having a shoe member and a shoe adapter, the shoe member having an end face and a contact face, wherein the contact face is non-perpendicular to the longitudinal axis, wherein the shoe adapter at least partially encloses the transducer and the shoe member, and wherein a chamber formed in the shoe adapter separates the transducer from the end face;

at least one positioner configured to adjust a position of the focal point along at least one axis perpendicular to an axis normal to the outer surface;

a coupling fluid filling the chamber, wherein changing an amount of coupling fluid in the chamber changes a focal distance of the focal point; and a control unit configured to apply the electrical signal to the transducer.

10. The apparatus of claim 9, wherein the feature includes a surface defining an opening in the body and an object disposed in the opening.

11. The apparatus of claim 9, wherein the at least one axis includes at least two orthogonal axes, and further comprising a plurality of positioners, each positioner of the plurality of positioners being configured to adjust the position of the focal point along a different axis of the least two orthogonal axes.

12. The apparatus of claim 9, further comprising:

a second probe configured to emit a second focused ultrasonic beam formed of longitudinal waves, the second focused ultrasonic beam having a second focal point and a second focal distance, the second probe being oriented to position the second focal point with reference to a second test location for the feature, the second test location being different from the first test location.

13. The apparatus of claim 12, wherein the control unit is further configured to control the second probe and to detect a second signal response from the second probe.

14. The apparatus of claim 12, wherein the at least one positioner include a first positioner set to adjust the position of the focal point of the probe and a second positioner set to adjust the position of the second focal point of the second probe.

15. The apparatus of claim 12, wherein the first positioner set adjusts the position of the focal point of the probe independently of the second positioner set.

* * * * *